US007248946B2

(12) United States Patent
Bashaw et al.

(10) Patent No.: US 7,248,946 B2
(45) Date of Patent: Jul. 24, 2007

(54) INVERTER CONTROL METHODOLOGY FOR DISTRIBUTED GENERATION SOURCES CONNECTED TO A UTILITY GRID

(75) Inventors: Travis B. Bashaw, Madison, WI (US); Robert T. Carpenter, Cohoes, NY (US); David A. Torrey, Ballston Spa, NY (US)

(73) Assignee: Advanced Energy Conversion, LLC, Ballston Spa, NY (US)

( * ) Notice: Subject to any disclaimer, the term of this patent is extended or adjusted under 35 U.S.C. 154(b) by 296 days.

(21) Appl. No.: 10/843,064

(22) Filed: May 11, 2004

(65) Prior Publication Data

US 2005/0254191 A1    Nov. 17, 2005

(51) Int. Cl.
*G06F 19/00*    (2006.01)
(52) U.S. Cl. .................. 700/286; 700/291; 361/42
(58) Field of Classification Search ............... 700/276, 700/286, 291, 21; 323/205, 299, 906; 361/42, 361/62; 363/95, 56, 43, 41, 207, 131, 71; 290/40, 44
See application file for complete search history.

(56) References Cited

U.S. PATENT DOCUMENTS

| 4,375,662 | A | | 3/1983 | Baker | |
|---|---|---|---|---|---|
| 4,404,472 | A | | 9/1983 | Steigerwald | |
| 5,225,712 | A | * | 7/1993 | Erdman | 290/44 |
| 5,268,832 | A | | 12/1993 | Kandatsu | |
| 5,604,430 | A | * | 2/1997 | Decker et al. | 323/275 |
| 6,118,680 | A | * | 9/2000 | Wallace et al. | 363/71 |
| 6,219,623 | B1 | | 4/2001 | Wills | |
| 2001/0007995 | A1 | * | 7/2001 | Makino | 709/219 |
| 2003/0067723 | A1 | * | 4/2003 | Suzui et al. | 361/42 |
| 2003/0173938 | A1 | * | 9/2003 | Trainer et al. | 323/205 |
| 2004/0165408 | A1 | * | 8/2004 | West et al. | 363/131 |
| 2005/0219872 | A1 | * | 10/2005 | Lys | 363/21.04 |

OTHER PUBLICATIONS

Chen et al., A new Maximum Power Point Tracking Controller for Photovoltaic Power Generation, 2003IEEE, pp. 58-62.*
Al-Amoudi et al., Real time Maximum Power Point Tracking For Grid Connected Photovltaic System, pawer Electronics and variable Speed Drives, Sep. 18-19, 2000. pp. 124-128.*
Kasa et al., "Robust Control for Maximum Power Point Tracking in Photovoltaic Power System", Proceedings of the IEEE Power Conversion Conference, pp. 827-832, Sep. 2002.
Pan et al., "A Fast Maximum Power Point Tracker for Photovoltaic Power Systems", Proceedings of the IEEE Industrial Electronics Conference, pp. 390-393, Mar. 1999.
Yaoqin et al., "A New Maximum Power Point Tracking Control Scheme for Wind Generation", Proceedings of the IEEE Power System Technology Conference, pp. 144-148, Feb. 2002.

* cited by examiner

*Primary Examiner*—Kidest Bahta
(74) *Attorney, Agent, or Firm*—John A. Merecki; Hoffman, Warnick & D'Alessandro, LLC

(57) ABSTRACT

The present invention provides an improved control methodology for maximum power point tracking (MPPT), anti-islanding, and output current regulation for distributed generation sources connected to a utility grid. The control includes enhancements for MPPT and regulating the inverter output-current that is sourced into the utility grid. In addition, the functions associated with MPPT, anti-islanding detection and output current regulation are integrated together; the MPPT algorithm operates in conjunction with the anti-islanding detection, and the output current regulation operates in conjunction with the MPPT algorithm.

36 Claims, 7 Drawing Sheets

INVERTER CONTROL METHODOLOGY FOR DISTRIBUTED GENERATION SOURCES CONNECTED TO A UTILITY GRID

BACKGROUND OF THE INVENTION

1. Technical Field

The present invention relates generally to distributed generation systems. More specifically, the present invention provides an inverter control methodology for maximum power point tracking (MPPT), anti-islanding, and output current regulation for distributed generation sources connected to a utility grid.

2. Related Art

The available power output from a solar photovoltaic (PV) array (comprised of one or more solar photovoltaic panels configured in some combination of parallel and series) depends on the amount of sunlight hitting the array (the insolation) and the array temperature. The output power is the product of the array voltage and array current. It is a characteristic of solar PV arrays, as well as other distributed energy sources, that the output voltage drops as the output current increases. With solar PV arrays, the output voltage drops monotonically with increasing output current. At some level of output current, the output voltage will begin to drop much more rapidly. Once this occurs, the power being output by the solar PV array begins to drop.

FIG. 1 shows a qualitative plot of array output voltage versus array output current for one level of insolation and one array temperature. Also shown in FIG. 1 is the power output by the solar PV array, indicating that the peak power delivered by the array occurs when the solar PV array is operating at the "knee" of the voltage-current characteristic. The voltage and power curves given in FIG. 1 change for other levels of insolation and array temperature, though they always maintain similar shapes. It is a standard objective to preferentially load the solar PV array so that it is operated at the maximum power point. Because of dynamic changes in array temperature and insolation, the tracking of the maximum power point is a dynamic process. Further, the double-valued nature of the cell power as a function of array current demands resolution of which side of the maximum power point the inverter is on in order to move in the correct direction toward the point of maximum power.

Maximum power point tracking (MPPT) under variable conditions (i.e. changing light intensity, changing temperature, and different solar photovoltaic characteristics) has been proposed by U.S. Pat. No. 4,404,472 (Steigerwald), U.S. Pat. No. 4,375,662 (Baker), and U.S. Pat. No. 5,268,832 (Kandatsu), incorporated herein by reference. Steigerwald proposes the perturb and observe method for detecting the maximum power point (MPP) to handle rapid changes in insolation. The commanded value of array current (the output current gain) is compared to the actual array current, and a decision is made to increase or decrease the command value. The magnitude of the output power change is compared with the expected change in magnitude. The current command is then changed in the direction associated with an increase in the array power. Baker proposes measuring the voltage and current from the array, so as to keep the slope of the voltage versus current curve at unity magnitude by changing the output power. The methodology uses a reference value that is determined by superimposing a current load on the array. The change in array voltage is used as an indication of the present operating point on the voltage versus current slope. Kandatsu proposes a method that forces the output power variation nearly to zero so as to maximize the average output power around the MPP. This method is used when the rate of change of the insolation is small; otherwise a method similar to the MPP method used by Steigerwald becomes active during rapid changes.

Kasa et al., "Robust Control for Maximum Power Point Tracking Photovoltaic Power System," Proceedings of the IEEE Power Conversion Conf., pp. 827-832, September 2002, proposes voltage control via the perturb and observe method and using an extra controller to maintain stability in the face of loose tolerances in array (solar PV array) parallel capacitance. Yaoqin et al., "A New Maximum Power Point Tracking Control Scheme for Wind Generation," Proceedings of the IEEE Power System Technology Conf. (PowerCon), pp. 144-148, February 2002, also uses the perturb and observe method as applied specifically to wind turbines. Pan et al., "A Fast Maximum Power Point Tracker for Photovoltaic Power Systems," Proceedings of the IEEE Industrial Electronics Conf. (IECON), pp. 390-393, March 1999, uses a different method by controlling the array current by a continuous analog controller. Each of the above-mentioned articles is incorporated herein by reference.

Another issue with utility interactive inverters is the detection of islanding. An islanding condition is created when the utility supply is interrupted but the inverter continues to provide energy to the utility system. If such a condition were allowed to persist, utility personnel are put at risk if they should come in contact with the section of the utility system that is energized by the inverter. For this reason, it is a safety requirement that any inverter that interacts with the utility be able to detect when the utility becomes de-energized. When such a condition is detected, the inverter must disconnect itself from the utility within a fixed amount of time. There are various ways to detect an islanding condition, but the most common approach is the one promulgated by Sandia National Laboratory. With this approach a small amount of positive feedback is used to modify the inverter output current amplitude and frequency based on the natural variations of the utility voltage and frequency. In this way the inverter is always trying to push the utility toward conditions that will cause the inverter to disconnect itself. This method is effective if the utility grid is sufficiently strong to resist the destabilizing actions of the inverter.

Methods to prevent islanding using voltage or frequency deviations has been proposed by U.S. Pat. No. 6,219,623 (Wills), incorporated herein by reference. Wills proposes: when a number of deviations have been detected over a given period of time, the control tries to force the output voltage or frequency in an accelerating manner outside the limits of normal grid operation to trigger a fault condition to shut down. This is similar in nature to the anti-islanding algorithm developed by Sandia National Laboratory. The essence of this algorithm is the use of a small amount of positive feedback in the inverter control so that increases in line frequency cause the inverter to try and increase frequency still further. Voltage variations are handled in a similar manner.

A third issue of importance to the performance of a utility-interactive inverter is the control of the inverter output current waveform. The general objective is to force the inverter output current to be of the same shape as the utility voltage and in phase with the utility voltage. That is, the output current waveform should be of low distortion.

There is a need, therefore, for an improved inverter control methodology for maximum power point tracking (MPPT), anti-islanding, and output current regulation for distributed generation sources connected to a utility grid.

SUMMARY OF THE INVENTION

The present invention provides an improved control methodology for maximum power point tracking (MPPT), anti-islanding, and output current regulation for distributed generation sources connected to a utility grid. Although solar photovoltaic (PV) arrays are the focus of the present invention, the invention can be applied to any distributed generation source (wind turbines, fuel cells, micro turbines, etc.) where it is desirable to deliver energy to the utility grid while optimally loading the energy source. The control includes enhancements for MPPT and regulating the inverter output-current that is sourced into the utility grid. In addition, there are advantages to integrating the functions associated with MPPT, anti-islanding detection and output current regulation. Specifically, the MPPT algorithm operates in conjunction with the anti-islanding detection, and the output current regulation operates in conjunction with the MPPT algorithm.

The disclosed invention has advantages in MPPT control and output-current control; these improvements over the prior art are accomplished by improvements in MPPT that are facilitated by improved current control and vice versa. Similarly, information used for MPPT is relevant for the detection of an islanding condition. Overall, coordination and integration of the MPPT, current control, and anti-islanding control result in improved inverter control characteristics.

The MPPT control provides fast response to rapid changes in insolation, while still maintaining stability. In this context, stability of the MPPT refers to the ability of the algorithm to quickly settle to the MPP. Some algorithms can get lost in determining on which side of the MPP the array is operating, or in making changes that are too large, causing the algorithm to bounce back and forth around the MPP. Many systems that use methods similar to the "perturb and observe" method ride on the edge of stability for AC inverter applications. In the practice this has been observed to be unstable for "low capacitance values."

Capacitance enters into the operation of the solar array in the following way: For a single-phase utility interface, the power output by the inverter fluctuates at twice the frequency of the AC utility. Power conservation requires that if the output power is fluctuating the input power must also fluctuate. Input power fluctuation can appear in the array voltage and current if there is insufficient capacitive energy storage. Fluctuation in array voltage leads to oscillation around the MPP.

The disclosed invention uses a part of the "perturb and observe" method for its control, but adds extra conditions to the algorithm to get the desired stability. In addition, the disclosed MPPT control accounts for dynamic changes in inverter efficiency, which is very common near low output power of any switching power converter. Systems that employ measuring the current, voltage, and/or power from the array for MPPT sensing, must account for the changes in inverter efficiency. Many other systems that measure the array voltage and current do not account for the change in inverter efficiency with operating point. This can lead to the system hanging (getting lost) or becoming unstable at low output power. The disclosed invention has the advantage of maintaining stability and not hanging at any operating point.

Stability is maintained through addition of an extra stage to the perturb and observe method, namely the condition three (Cond 3) stage (shown in FIG. 3). This essentially introduces a phase lead term in the controller that prevents the system from drawing power greater than that available at the MPP, and helps in maintaining system operation at or just under MPP. Hanging can happen when there is no accounting for the variations in the inverter efficiency with output power. Inverter efficiency is used in the present invention by making one of the decision variables ($p\_incl(k[m])$) a function of the output current gain variable ($k[m]$), where ($p\_incl(k[m])$) is a power change incline function. The power change incline ($p\_incl$) function is synthesized by a piecewise linear approximation of a typical efficiency curve for the inverter to which the invention is applied.

The disclosed invention features improved output-current control relative to traditional control techniques. This includes, for example, simultaneous use of feed-forward, the normalization of the proportional-integral-derivative (PID) gains with respect to the array voltage, and the use of power normalization. The feed-forward control reduces the integrator control effort, thus giving rise to faster response while maintaining stability; and hence, lower output current distortion especially at low output current amplitudes. The normalization of the PID controller gains and the feed-forward gains with respect to the array voltage maintain consistent control characteristics over any array voltage (i.e., the control output characteristics become independent of the array voltage). This feature is useful in systems that do not have a regulated supply at any stage of the inverter. The output-power normalization (see, e.g., FIG. 6) allows for consistent output power with respect to the output current gain, regardless of the grid RMS voltage.

This has the advantage of ensuring the MPPT controller operates under consistent conditions (i.e., a change in the output current gain $k[m]$ always leads to the same linear change in the output power) regardless of grid RMS voltage. Ignoring the effects of grid RMS voltage can have a detrimental effect in some applications where the inverter is expected to operate within 10% deviations in the ideal grid voltage. This can lead to power changes of 20% if power normalization is not performed. This 20% possible deviation from the expected output power acts to reduce the stability gain margin if the controller is optimized at the ideal voltage.

The disclosed invention has advantages of simplified anti-islanding control by integrating the proposed MPPT method with the anti-islanding algorithm. The proposed MPPT, as defined, constantly changes the output power. This change in output power corresponds to a change in output voltage that can be detected by the anti-islanding control to determine whether or not the inverter is in an island condition. That is, under islanding conditions, increasing the output power will serve to increase the output voltage. It should be noted that for the disclosed invention, the anti-islanding controller could be used in conjunction with other methods for detecting an island situation (i.e., frequency and voltage methods that try to force the grid outside normal operating conditions so the inverter enters fault mode and shuts down).

The disclosed invention provides better stability of its MPPT by virtue of its output-current control. The feed-forward and gain normalization help to keep the output current distortion low. Without it, the distortion can lead to unexpected changes in output power when the current gain is incremented or decremented by the MPPT. Thus, this can lead to instability. Also, the output current is normalized with respect to the utility RMS voltage to allow for consistent changes in output power regardless of the grid RMS voltage; hence, the MPPT is stable over any range of the utility RMS voltage. The added features of the output-current control help to prevent instability of the MPPT.

Since the output current waveform has less distortion, the net output power is closer to its expected value for a given value of the current gain. This eliminates the need to measure the output power so the controller can account for instabilities or hanging that might occur—a case similar to the hanging and instability that can arise when there is no account for the inverter efficiency as described above, except in this case it is correlated with power at the output (power into the utility). In either case, instability and hanging can arise for those systems that sense the array power for control, whereby the output power is not consistent with the commanded current gain, or the efficiency is not accounted for in the algorithm. This invention is different from all others in that it eliminates these problems.

While the preferred embodiment of the present invention includes specifics for constant MPPT controller gains, it is not limited to operation in this manner. Artificial intelligence can further optimize the gains for a specific environment; thus, further optimizing the system over the preset gains. Although not explicitly shown in the preferred embodiment, the output-current controller can feature a better control system by taking advantage of the periodic nature of its reference signal (the AC utility voltage). Such a system would add a correction factor to the controller output that is recalled from the previous cycle. The correction factor is a particular element in an array of data points that contains the difference between the feed forward output and the total controller output. The particular element that is loaded is the one that was stored during the previous cycle of the utility voltage. Taking advantage of the periodicity of the signal allows for the array to be finite (in that it stores only one period of data), and its length to be within practical bounds. This correction factor along with the feed forward causes the control output to converge to the ideal controller output; and hence, also to the ideal output current signal.

A first aspect of the present invention is directed to a method for maximum power point tracking (MPPT) in a distributed generation system coupled to an alternating current (AC) power grid, comprising: comparing a current gain of the distributed generation system between zero crossings of the AC power grid; if the current gain has decreased in the current gain comparing step, comparing a change in power magnitude of the distributed generation system between the zero crossings of the AC power grid with an expected power decrement and, if the change in power magnitude is greater than a factor q of the expected power decrement, incrementing the current gain, otherwise decrementing the current gain; if the current gain has not decreased in the current gain comparing step, comparing the change in power magnitude of the distributed generation system between the zero crossings of the AC power grid with an expected power increment and, if the change in power magnitude is less than the factor q of the expected power increment, decrementing the current gain, otherwise comparing the change in power magnitude to a power incline function and incrementing or decrementing the current gain based on the comparison.

A second aspect of the present invention is directed to a system for improving regulation of an output current of an inverter coupled between a distributed generation system and an alternating current (AC) power grid, comprising: a proportional-integral-derivative (PID) controller; a feed forward controller; and a power normalization controller.

A third aspect of the present invention is directed to a method for maximum power point tracking (MPPT) in an inverter coupled between a distributed generation system and an alternating current (AC) power grid, comprising: enhancing a quality of an output current of the inverter through combined use of a proportional-integral-derivative (PID) controller, a feed forward controller, and a power normalization controller; and improving stability of the MPPT by performing the MPPT on the enhanced quality output current.

A fourth aspect of the present invention is directed to a method for detecting an islanding condition in a system including a distributed generation system and an inverter coupled between the distributed generation system and an AC power grid, comprising: comparing an RMS voltage of the AC power grid with an island threshold; if the RMS voltage is greater than the island threshold, determining if a change in the RMS voltage reflects a change made to a current gain of the inverter when islanding; if the change in the RMS voltage reflects a change made to the current gain of the inverter when islanding, then incrementing a number of island hits; processing the number of island hits that occurred during a collection period; and enabling or disabling the inverter based on the number of island hits that occurred during the collection period.

A fifth aspect of the present invention is directed to a method for detecting an islanding condition in a system including a distributed generation system, an inverter coupled between the distributed generation system and an AC power grid, and a maximum power point tracking (MPPT) system for tracking a maximum power point (MPP) of the distributed generation system, comprising: using a change in current gain as determined by the MPPT system to detect an islanding condition.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

Figure 1:
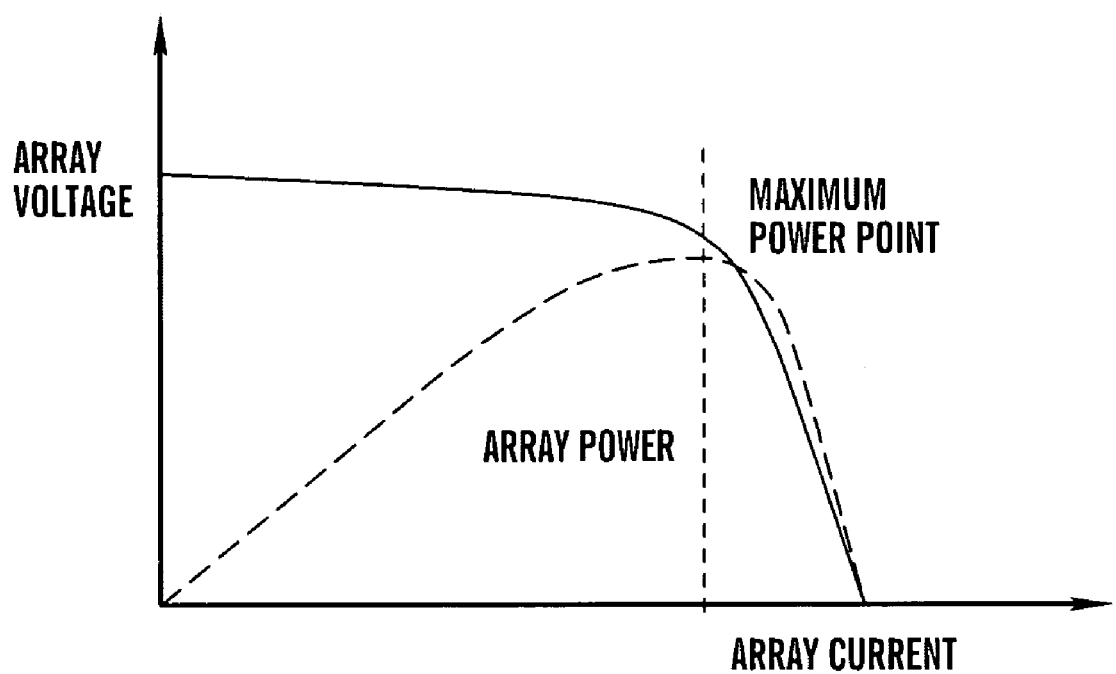
FIG. 1 illustrates a qualitative plot of array voltage as a function of array current, along with array output power, for a solar photovoltaic (PV) array.
Figure 2:
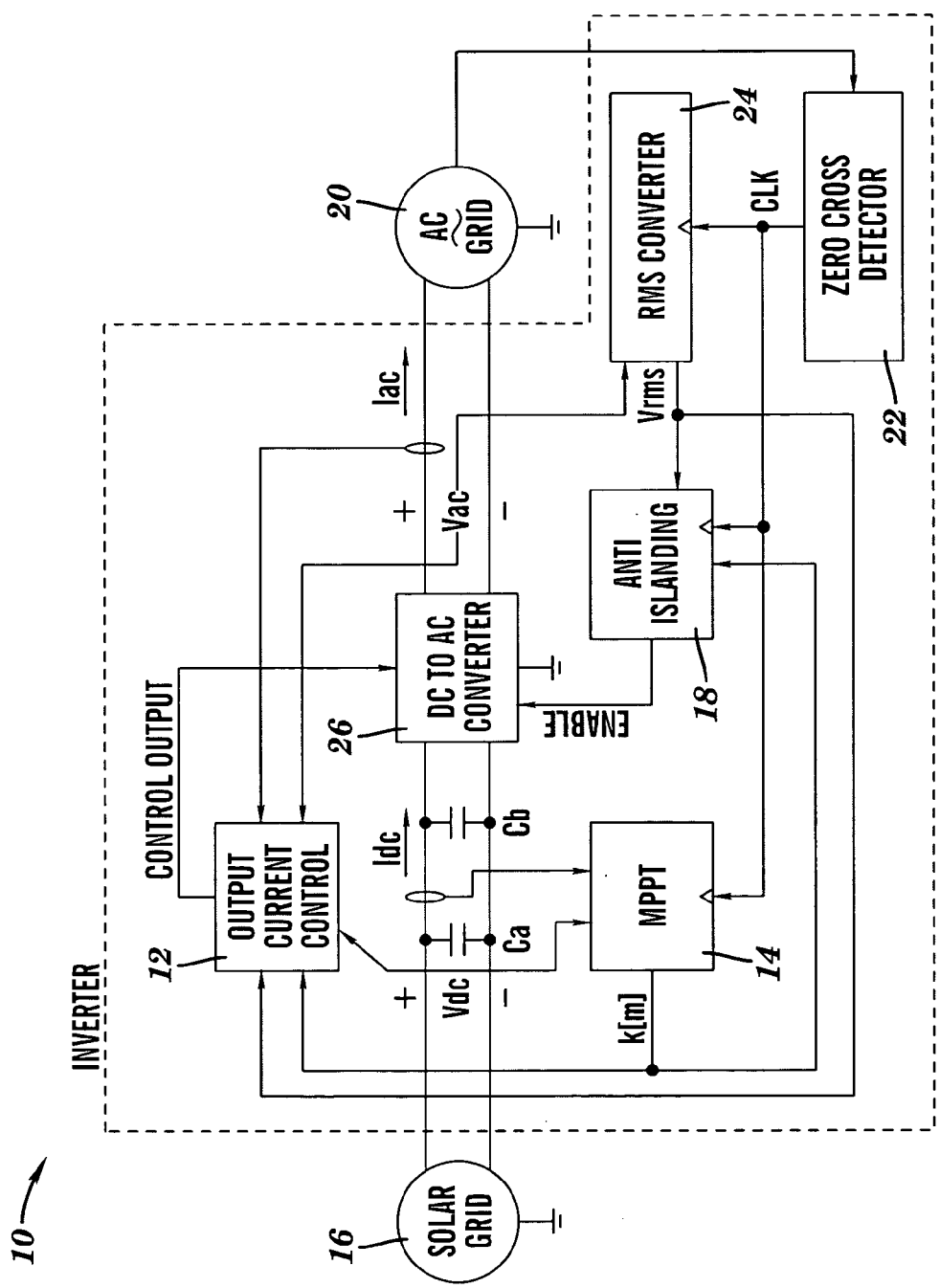
FIG. 2 illustrates an inverter control system in accordance with the present invention.

A control system for an inverter 10 in accordance with the present invention is illustrated in FIG. 2. As shown, the inverter control system has three main components: an output current control 12, a maximum power point tracking (MPPT) system 14 for determining the peak power operating point of a solar grid 16, and an anti-islanding controller 18. These control elements contain both individual enhancements and collective enhancements over the prior art.

In FIG. 2, the solar grid 16 (also known as a solar PV array) comprises a combination of solar-photovoltaic cells from which the inverter 10 draws power. The AC-grid 20 represents the utility into which power is sourced by the inverter 10. A zero cross detector 22 provides a clock signal CLK used to synchronize execution of an RMS voltage calculation by an RMS converter 24, anti-islanding detection by the anti-islanding controller 18, and execution of an MPPT algorithm by the MPPT system 14. A direct current (DC) to alternating current (AC) converter 26 operates to convert the DC output of the solar grid 16 to AC which is supplied to the AC-grid 20.

Operation of the MPPT Algorithm

Figure 3:
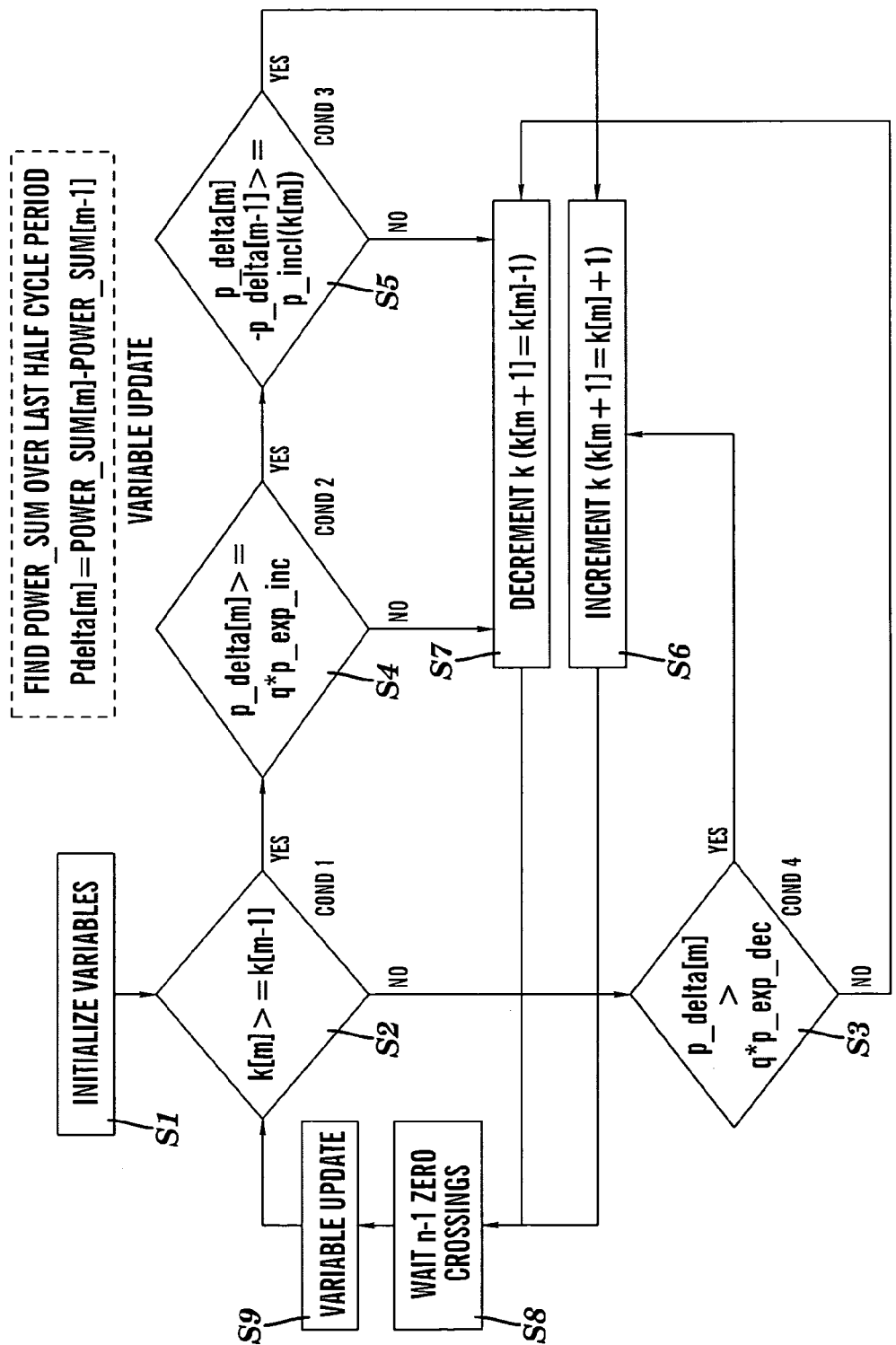
FIG. 3 illustrates a flow diagram of an MPPT algorithm in accordance with the present invention.

The MPPT algorithm of the present invention is illustrated in greater detail in FIG. 3. The MPPT algorithm uses an improved form of the "perturb and observe" method that is implemented on a discrete time basis. In particular, the MPPT algorithm makes a decision to increment (step S6) or decrement (step S7) the AC output current every n zero crossings of the AC grid voltage (every n/2 cycles of the AC grid 20), where the zero crossings are determined by the zero cross detector 22. The power from the solar grid 16 (power_sum) is calculated between the last two zero crossings regardless of the output current update period (n zero crossings), since the last half cycle contains a closer approximation to the steady state input power. It will be appreciated that changes in power are created by incrementing or decrementing the commanded value of output current. Further, power is measured by processing measurements of voltage and current.

In step S1, the variables used in the MPPT algorithm are initialized. In step S2, the current gain (k) between the two latest zero crossings is compared. If the current gain at the most recent zero crossing is less than the current gain at the previous zero crossing, then in step S3, the change in solar power magnitude (p_delta), which is nearly proportional to the change in the current gain (k), is compared with the ideal expected power decrement (p_exp_dec). If the change in solar power magnitude (p_delta) is greater than some factor (q) of the ideal expected power decrement (p_exp_dec), then condition 4 (Cond 4) is satisfied and the current gain (k) is incremented in step S6. Otherwise, the current gain (k) is decremented in step S7. Regardless of which one is executed, step S6 or S7, both then go on to wait n-1 zero crossings (step S8), update the variables (step S9), and then flow returns to step S2.

If, in step S2, the current gain at a most recent zero crossing is greater than or equal to the current gain at the previous zero crossing, then condition 1 (Cond 1) is satisfied. Flow then continues to step S4, where the change in solar power magnitude (p_delta) is compared with the ideal expected power increment (p_exp_inc). In particular, if the change in solar power magnitude (p_delta) is less than a factor (q) of the ideal expected power increment (p_exp_inc), then the current gain (k) is decremented in step S7. Otherwise, condition 2 (Cond 2) is satisfied and flow continues to step S5.

In step S5, the change in solar power magnitude (p_delta) is compared to the power change incline (p_incl) function, a measure of how the inverter efficiency varies with output current. In particular, if the change in solar power magnitude (p_delta) at the two most recent zero crossings is less than the power change incline (p_incl) function, then the current gain (k) is decremented in step S7. Otherwise, condition 3 (Cond 3) is satisfied and the current gain (k) is incremented in step S6. Condition three is added for increased stability near the maximum output power capability of the solar grid 16, rather than just leading the true path of condition two to increment the power as is done in previous perturb and observe methods found in the prior art.

The number of zero crossings (n) is dependent on the amount of capacitance in Ca and Cb, which are illustrated in FIG. 2. The number of n/2 cycles should be set so that it increases in proportion to the sum of the capacitances Ca and Cb and inversely to the current draw change (Idc in FIG. 2) for a given change in the current gain (k). The current gain k sets the magnitude of the inverter output current through Iac=kVac. Both capacitances Ca and Cb have a different effect on the initial sensed offset error (ISOE); however, they both contribute in the same proportion to the sensed power time constant. This time constant causes effective delays between the actual power delivered by the source and the sensed power measured by the controller, where it creates a time decaying sensed error (TDSE), where the initial error value is the ISOE, immediately following a power increment/decrement. The effect of each capacitor on the ISOE and TDSE can be divided up into the following 4 cases:

1) Ca is zero and Cb non-zero: The TDSE is only dependent on Cb. The ISOE becomes independent of Cb.
2) Cb is zero and Ca non-zero: The ISOE becomes zero; and hence, the TDSE is not applicable.
3) Ca and Cb is zero: since Cb is zero, the value of Ca does not matter, and the ISOE becomes zero; and hence, the TDSE is not applicable.
4) Ca and Cb non-zero: The TDSE is dependent on the sum Ca of Cb; however, the ISOE depends on both Ca and Cb in such a way that each of their contributions to the ISOE are different.

The TDSE and the ISOE of the power sensing affect the sensed change in power for a given change in the current gain (k); hence, the TDSE affects the factor q, where the ideal expected power increment (p_exp_inc) and the ideal expected power decrement (p_exp_dec) are the ideal expected changes in power for a given change in the current gain (k). The number of n/2 cycles affects the time samples used to compute the change in the power; hence, the factor q must be set appropriately for a given value of n, in addition to the TDSE and ISOE. The factor q is selected such that it decreases with increase in TDSE and/or IDSE, and decreases with a decrease in n/2 cycles. This accounts for the smaller change (smaller than the expected power change) in current seen by the sensing circuitry when the output power changes in a direction opposite to the previous change. The factor q could be implemented as a constant or a variable (varies depending on the previous power changes and the present change—so as to account for different current sensing conditions). For example, if the capacitor Cb is zero or small compared to Ca in a particular application, the sensor sees the inverter current directly, so q would be set near unity. In the case where Ca is zero or small enough relative to Cb, q would be set to less than unity to a value determined by Cb. When neither capacitor (Ca or Cb) dominates over the other, q would be set to less than unity determined by both capacitors (Ca and Cb). The value of the power change incline (p_incl(k[m])) function is set so that it varies with the output current gain. This factor is responsible for the stability of the MPPT over areas where the efficiency of the inverter is highly dynamic with output current, and the stability near the MPP. The power change incline (p_incl(k[m])) function is set to a higher value in an area where efficiency is highly dynamic, and a lower value in an area where the efficiency is not so dynamic. Accordingly, this factor is dependent on the inverter efficiency as a function of output current.

The power change incline (p_incl) function is necessary for preventing system instability. There are larger dynamics at lower inverter efficiencies, and smaller dynamics at higher inverter efficiencies in the array power change for a unit change in the current gain. Since the power change incline (p_incl) function is compared to the change in these output power changes (in condition 3 of FIG. 3), the function should be synthesized in direct relation to these dynamics (see, e.g., FIG. 5). The ideal expected power variables (p_exp_inc and p_exp_dec) could also be a function of the inverter efficiency similar to the shape of the power change incline (p_incl) function. In either case at least the power change incline (p_incl) function must be a function of the inverter efficiency to prevent hanging and instability.

Figure 4:
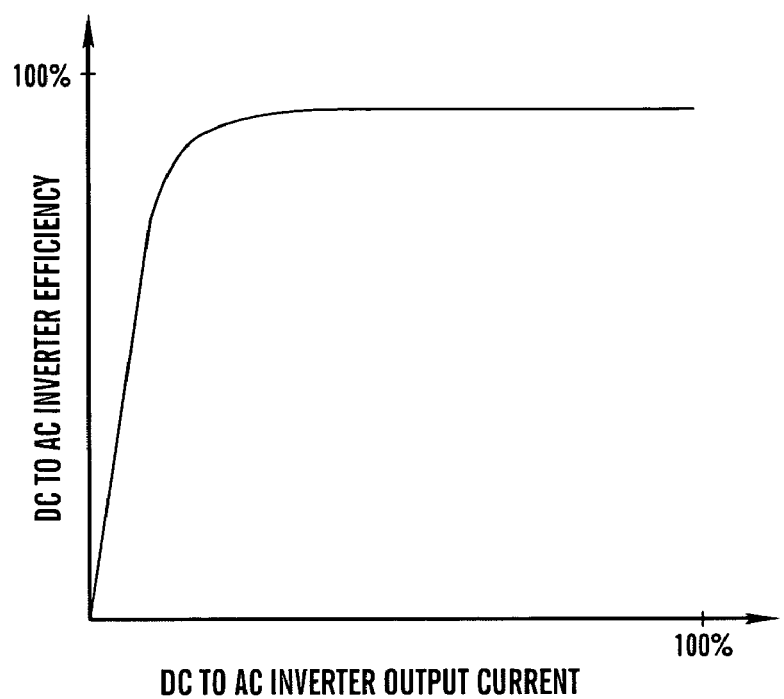
FIG. 4 illustrates a typical graph of inverter efficiency versus output current.
Figure 5:
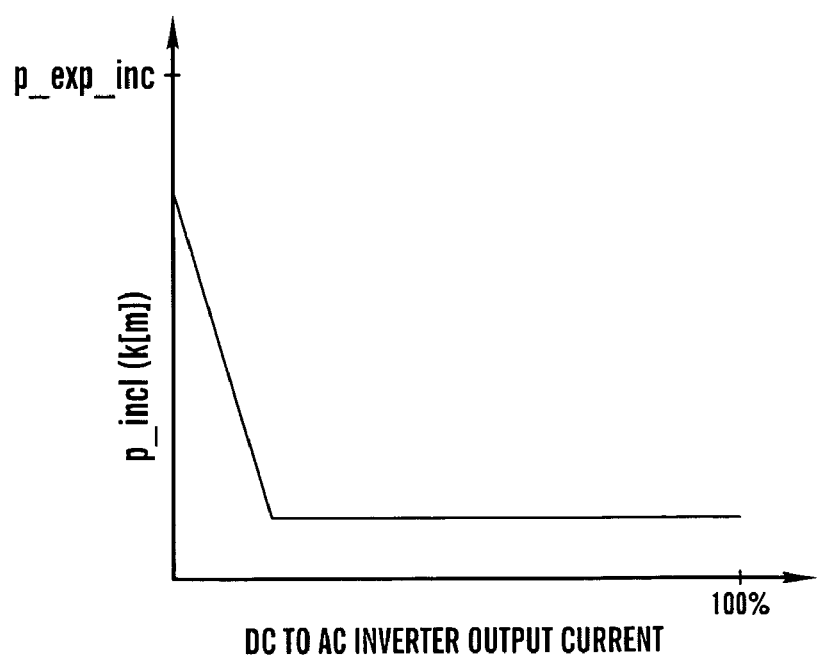
FIG. 5 illustrates a typical implementation of a power change incline function for the inverter efficiency curve shown in FIG. 4.

In a preferred embodiment of the present invention:

The range of q should almost always be between 0 and 1 (typically between 0.25 and 0.5);

The values of the expected power increments and decrements (p_exp_inc and p_exp_dec) are defined as the exact expected output power change into the AC grid that should occur for a given change in the output-current gain (k). Typically, the expected power decrement (p_exp_dec) is made to be between 1.0 and 2.0 times the expected power increment (p_exp_inc);

The number of zero crossings (n) is a positive integer typically between 2 and 10; and The power change incline (p_incl(k[m])) function is typically set to vary between zero and no greater than the expected power increment (p_exp_inc). Typical inverter efficiency versus output current is shown in FIG. 4. In many cases inverters have lower efficiency at the lower extreme of output currents, and in this area the efficiency is highly dynamic with output current. Once the output current exceeds a certain point, the efficiency becomes much less dynamic. A typical implementation of the power change incline (p_incl(k[m]) function is shown in FIG. 5 for the inverter efficiency curve shown in FIG. 4.

The Output Current Control

Figure 6:
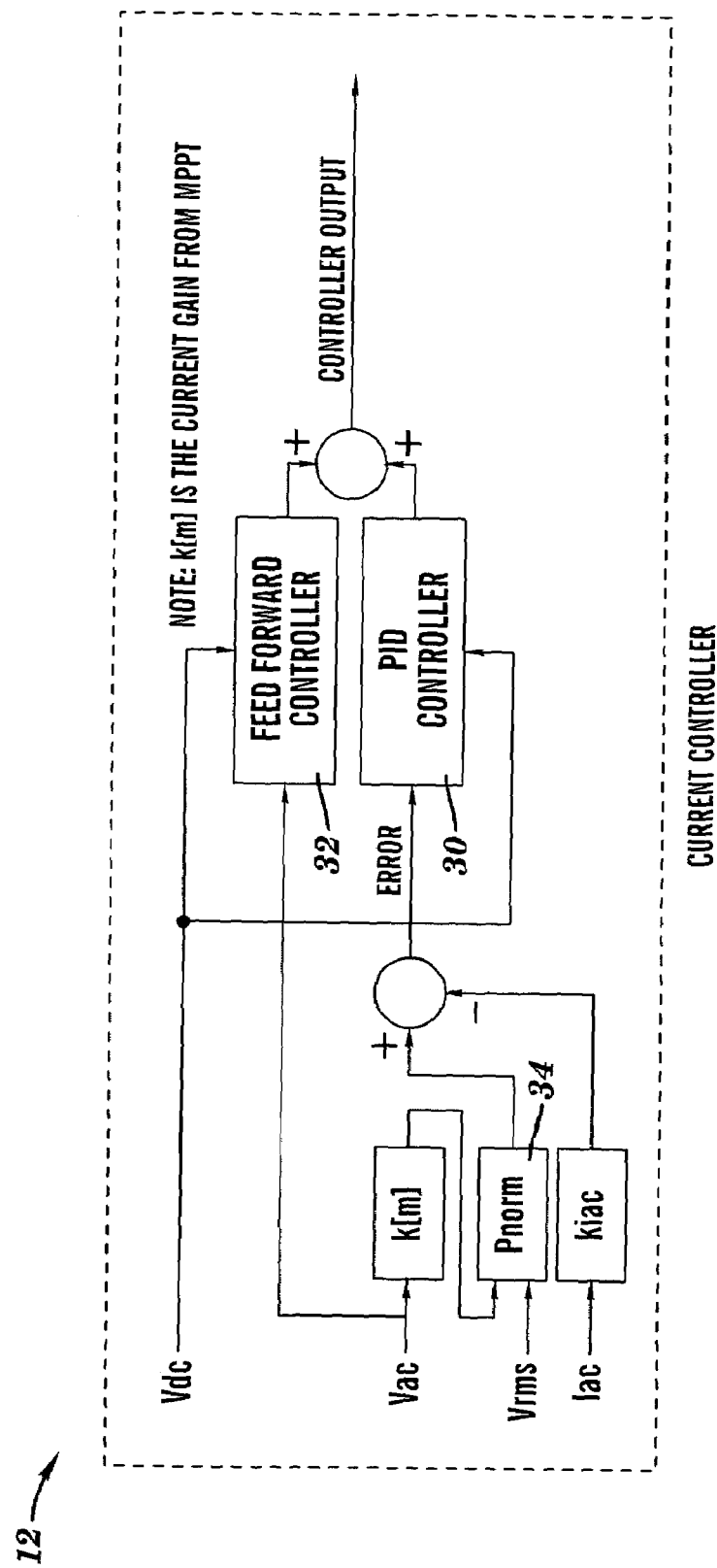
FIG. 6 illustrates an output current control in accordance with the present invention.
Figure 7:
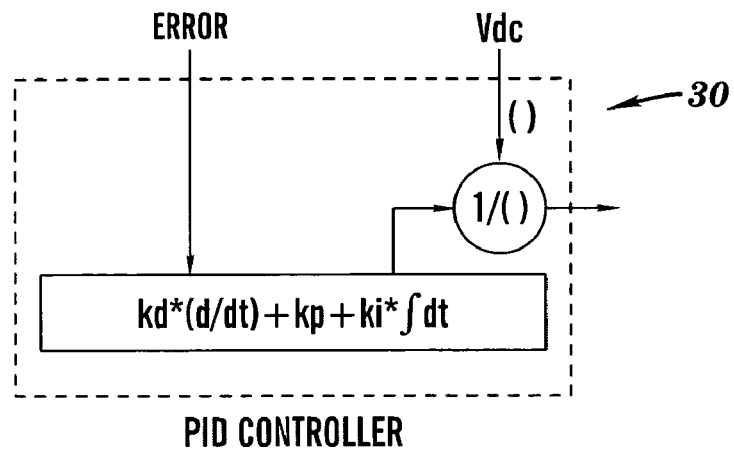
FIG. 7 illustrates the proportional-integral-derivative (PID) controller of the output current control of FIG. 6 in greater detail.
Figure 8:
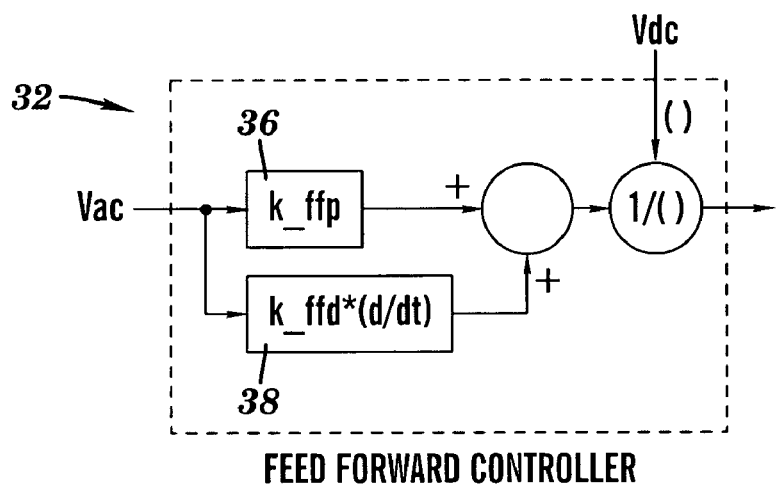
FIG. 8 illustrates the feed forward controller of the output current control of FIG. 6 in greater detail.
Figure 9:
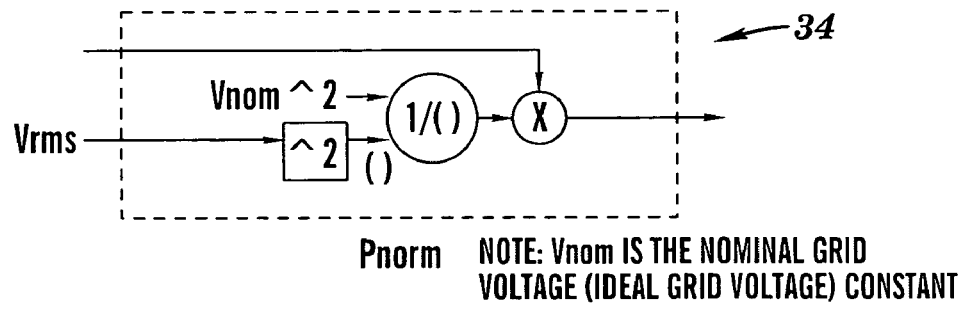
FIG. 9 illustrates the power normalization controller of the output current control of FIG. 6 in greater detail.

As shown in FIG. 6, the output current control 12 uses three main components: a proportional-integral-derivative (PID) controller 30, a feed-forward controller 32, and a power normalization controller 34. The PID controller 30, feed-forward controller 32, and power normalization controller 34 are shown in greater detail in FIGS. 7, 8, and 9, respectively. The PID controller 30 is normalized to the input solar array voltage for systems with effective gains that are proportional to the solar array voltage. This allows for consistent controller response over any voltage range. The feed-forward controller 32 adds both a direct proportion 36 and derivative proportion 38 of the AC grid voltage (Vac) to the controller output. This helps to decrease the integral control effort within the PID controller, and when the constants are chosen appropriately, allows for the PID controller 30 to operate in a more linear region, thereby reducing the distortion in the output current waveform. The power normalization (Pnorm) accounts for variations in the cycle RMS voltage so as to keep the output power consistent with the value of the current gain control (k).

The gains of the feed-forward controller 32 are set so that the output of the feed-forward controller 32 is just slightly less than what is necessary to source the desired current into the AC grid 20. Accordingly, k_ffp and k_ffd depend on the value of the current gain k. Note that these gains should be set to add phase lead so that they account for any phase delay that might develop from filter components between the feed forward controller 32 and the inverter 10 output and where the current output is sensed.

Anti-Islanding Function

The anti-islanding system 18 includes an anti-islanding algorithm that checks for RMS voltage changes on the AC grid 20, and determines whether to disable the inverter 10 based on the number of island hits over the collection period. The collection period is synchronized to the utility frequency through zero-crossings of the utility voltage. The length of the collection period is tied to the regulatory requirements that dictate the minimum time for sensing an islanding condition; for purposes of illustration, consider the collection interval to be tied to X zero crossings of the source. The anti-islanding algorithm observes changes in grid voltage and determines whether the magnitude change exceeds a threshold point check for the islanding condition. If the threshold is exceeded enough times within a given amount of time (the collection period) the inverter 10 is disabled. The collection period is often set to a multiple of the grid period such that it is less than 2 seconds, and greater than 10 grid periods, such that there is a large enough collection period to prevent false triggering from randomly fluctuating line conditions. Identification of an islanding condition within a prescribed period of time is required for regulatory compliance. It should be noted that the methods described here for anti-islanding could be used in addition to checking that the frequency and voltage of the grid is within regulatory compliance.

Figure 10:
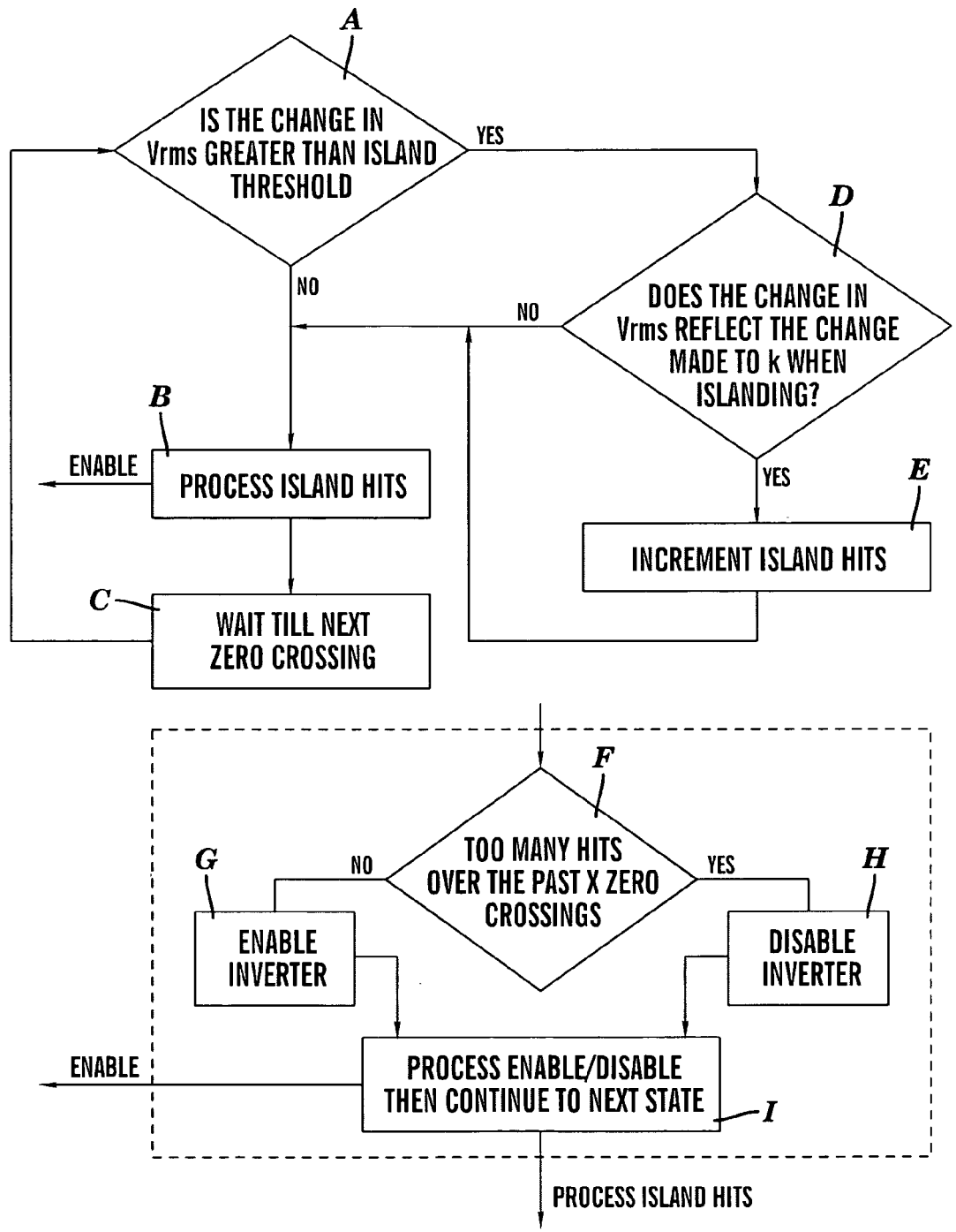
FIG. 10 illustrates a flow diagram of an anti-islanding algorithm in accordance with the present invention.

A method flow diagram of an anti-islanding algorithm in accordance with the present invention is shown in FIG. 10. In step A, the change in $V_{RMS}$ output by the RMS converter 24 is compared to an island threshold. If the change in $V_{RMS}$ is less than the island threshold, then flow passes to step B where the island hits are processed and the inverter 10 is enabled or remains enabled. At the next zero crossing (step C), step A is repeated. In step B the island hits are processed through comparison of a counter to a predetermined threshold. If the number of island hits exceeds this predetermined threshold, the inverter is disabled. If the number of island hits is below this threshold, the inverter is enabled to continue operating. Decision block F in FIG. 10 keeps track of the island hits over a window of recent samples. So in essence, block F contains a queue (of length X) of the island hits and will disable the inverter if the number of hits in the queue exceeds the threshold value (too many hits), otherwise the inverter is or remains enabled. An alternative approach would be to use a moving window of length X to identify an island condition, but this would require keeping track not only of the number of island hits, but when they occur.

If the change in $V_{RMS}$ is determined in step A to be greater than the island threshold, then flow passes to step D. In step D, the anti-islanding algorithm determines if the change in $V_{RMS}$ reflects a change made to the current gain (k) when islanding. In essence step D is evaluating the incremental resistance of the load. If the incremental resistance is below that associated with the inverter output current and the utility voltage, the utility must still be present and an islanding condition does not exist. If, however, the incremental resistance is equal to that associated with the inverter output current and the utility voltage, then the utility is not absorbing any power and the conclusion is that an island condition exists. If not, flow passes to step B. Otherwise, the number of island hits (i.e., the number of times the island threshold has been exceeded) is first incremented in step E and then flow passes to step B.

In step F, it is determined whether the number of island hits that have occurred during the collection period has exceeded a predetermined threshold. If the number of island hits has not exceeded the threshold, the inverter 10 is enabled (step G) or remains enabled. If the number of island hits has exceeded the threshold, indicating an islanding condition, the inverter 10 is disabled (step H). In step I the state of the enable signal determined by steps F, G, and H is sent to the inverter 10, and the flow continues to step C.

MPPT and Anti-Islanding

Since the MPPT is constantly changing the inverter output power every n/2 cycles, this change in power (as reflected by the change in current gain (k) by the MPPT) is used to detect an islanding condition. In particular, an increase in inverter output power will drive a sufficiently large increase in the AC grid voltage in an islanding condition to facilitate detection of the islanding condition. In the absence of an islanding condition, an increase in the inverter output power will not cause a sufficient increase in the grid voltage to allow for detection of an islanding condition.

Output Current Control to Optimize the MPPT

If the quality of the output current waveform is sufficiently poor, the MPPT can become confused (hang) or become unstable. The output current control 12 has three features to simultaneously enhance the quality of the output current and thus allow for more optimal performance of the MPPT algorithm: 1) normalization of the power described previously; 2) the normalization of the PID controller coefficients and the feed-forward coefficients with respect to the solar array voltage; and, 3) the use of feed-forward control.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A method for maximum power point tracking (MPPT) in a distributed generation system coupled to an alternating current (AC) power grid, comprising:

comparing a current gain of the distributed generation system between zero crossings of the AC power grid;

if the current gain has decreased in the current gain comparing step, comparing a change in power magnitude of the distributed generation system between the zero crossings of the AC power grid with an expected power decrement and, if the change in power magnitude is greater than a factor q of the expected power decrement, incrementing the current gain to set a peak operating point of the distributed generation system, otherwise decrementing the current gain to set the peak operating point of the distributed generation system;

if the current gain has not decreased in the current gain comparing step, comparing the change in power magnitude of the distributed generation system between the zero crossings of the AC power grid with an expected power increment and, if the change in power magnitude is less than the factor q of the expected power increment, decrementing the current gain to set the peak operating point of the distributed generation system, otherwise comparing the change in power magnitude to a power incline function and incrementing or decrementing the current gain based on the comparison to set the peak operating point of the distributed generation system.

2. The method of claim 1, wherein an inverter is used to couple the distributed generation system to the AC power grid, and wherein the power incline function comprises a measure of how the efficiency of the inverter varies with output current.

3. The method of claim 1, wherein, if the change in power magnitude of the distributed generation system between the zero crossings of the AC power grid is less than the power incline function, decrementing the current gain, otherwise incrementing the current gain.

4. The method of claim 3, wherein the method is repeated after an output power update period.

5. The method of claim 4, wherein the output power update period comprises a predetermined number of zero crossings of the AC power grid.

6. The method of claim 5, wherein an inverter is used to couple the distributed generation system to the AC power grid, and wherein the predetermined number of zero crossings is dependent upon a capacitance in parallel with the inverter input.

7. The method of claim 5, wherein the predetermined number of zero crossings is between 2 and 10.

8. The method of claim 3, wherein the step of comparing the change in power magnitude to the power incline function increases stability near a maximum output power capability of the distributed generation system.

9. The method of claim 1, wherein the distributed generation system comprises any distributed generation source where it is desirable to deliver energy to the AC power grid while optimally loading the source.

10. The method of claim 1, wherein q is between 0 and 1.

11. The method of claim 10, wherein q is between 0.25 and 0.5.

12. The method of claim 1, wherein the expected power decrement and the expected power increment comprise exact expected power changes into the AC power grid that should occur for a given change in the current gain.

13. The method of claim 1, wherein the expected power decrement is about 1.0 to 2.0 times the expected power increment.

14. The method of claim 1, wherein the power incline function varies between zero and no greater than the expected power increment.

15. The method of claim 1, wherein the step of comparing the change in power magnitude to a power incline function and incrementing or decrementing the current gain based on the comparison prevents power greater than that available at a maximum power point (MPP) from being drawn from the distributed generation system.

16. A system for improving regulation of an output current of an inverter coupled between a distributed generation system and an alternating current (AC) power grid, the inverter converting a direct current (DC) provided by the distributed generation system into the output current, comprising:
    a proportional-integral-derivative (PID) controller coupled to a DC output voltage of the distributed generation system;
    a feed forward controller coupled to the DC output voltage of the distributed generation system and to an AC output voltage of the AC power grid; and
    a power normalization controller.

17. The system of claim 16, wherein the PID controller and the feed forward controller are normalized to an output voltage of the distributed generation system.

18. The system of claim 17, wherein the normalization of the PID controller and the feed forward controller to the output voltage of the distributed generation system reduces distortion in an output current of the inverter.

19. The system of claim 16, wherein the feed forward controller is configured to reduce integral control effort within the PID controller.

20. The system of claim 19, wherein reduction of the integral control effort within the PID controller reduces distortion in an output current of the inverter.

21. The system of claim 16, wherein the power normalization controller is normalized to an RMS voltage of the AC power grid.

22. The system of claim 16, wherein the inverter further includes a maximum power point tracking (MPPT) controller, and wherein the system for improving regulation of an output current improves stability of the tracking provided by the MPPT controller.

23. The system of claim 22, wherein the system for improving regulation of an output current ensures that the MPPT controller operates under consistent conditions regardless of an RMS voltage of the AC power grid.

24. A method for maximum power point tracking (MPPT) in an inverter coupled between a distributed generation system and an alternating current (AC) power grid, comprising:
    enhancing a quality of an output current of the inverter through combined use of a proportional-integral-derivative (PID) controller, a feed forward controller, and a power normalization controller; and
    performing the MPPT on the enhanced quality output current to improve stability of the MPPT.

25. The method of claim 24, further comprising:
    normalizing the PID controller and the feed forward controller to an output voltage of the distributed generation system.

26. The method of claim 25, wherein the normalization of the PID controller and the feed forward controller to the output voltage of the distributed generation system reduces distortion in an output current of the inverter.

27. The method of claim 24, further comprising:
    configuring the feed forward controller to reduce integral control effort within the PID controller.

28. The method of claim 27, wherein reduction of the integral control effort within the PID controller reduces distortion in an output current of the inverter.

29. The method of claim 24, further comprising:
    normalizing the power normalization controller to an RMS voltage of the AC power grid.

30. A method for detecting an islanding condition in a system including a distributed generation system and an inverter coupled between the distributed generation system and an AC power grid, comprising:
    comparing an RMS voltage of the AC power grid with an island threshold;
    if the RMS voltage is greater than the island threshold, determining if a change in the RMS voltage reflects a change made to a current gain of the inverter when islanding;
    if the change in the RMS voltage reflects a change made to the current gain of the inverter when islanding, then incrementing a number of island hits;
    processing the number of island hits that occurred during a collection period; and
    enabling or disabling the inverter based on the number of island hits that occurred during the collection period.

31. The method of claim 30, wherein the current gain of the inverter is provided by a maximum power point tracking (MPPT) system.

32. The method of claim 30, further comprising:
    repeating the comparing step at a next zero crossing of the AC power grid.

33. The method of claim 30, wherein the step of processing the number of island hits that occurred during a collection period further comprises:
    comparing the number of island hits that occurred during the collection period to a predetermined threshold; and
    if the number of island hits that occurred during the collection period exceeds the predetermined threshold, thereby indicating an islanding condition, then disabling the inverter, otherwise enabling or continuing to enable the inverter.

34. The method of claim 30, wherein the collection period comprises a plurality of zero crossings of the AC power grid.

35. The method of claim 30, wherein the collection period comprises a window of recent zero crossings of the AC power grid.

36. The method of claim 35, wherein the window is moving.

\* \* \* \* \*